United States Patent [19]
Wakabayashi et al.

[11] Patent Number: 5,666,565
[45] Date of Patent: Sep. 9, 1997

[54] FOCAL LENGTH VARYING DEVICE WHICH AVOIDS ERRORS DUE TO MOLD PARTING LINES

[75] Inventors: Hiroshi Wakabayashi, Yokohama; Minoru Kato, Kawasaki, both of Japan

[73] Assignee: Nikon Corporation, Tokyo, Japan

[21] Appl. No.: 626,691

[22] Filed: Apr. 2, 1996

Related U.S. Application Data

[63] Continuation of Ser. No. 302,478, Sep. 12, 1994, abandoned, which is a continuation of Ser. No. 918,693, Jul. 27, 1992, abandoned.

[30] Foreign Application Priority Data

Jul. 30, 1991 [JP] Japan ................................. 3-212618

[51] Int. Cl.$^6$ ................................................ G02B 15/14
[52] U.S. Cl. .......................... 396/79; 396/85; 396/134; 359/699
[58] Field of Search ......................... 354/195.1, 195.12, 354/400; 359/699, 700, 701; 396/72, 79, 85, 133, 134

[56] References Cited

U.S. PATENT DOCUMENTS

| | | | |
|---|---|---|---|
| 4,386,829 | 6/1983 | Sumi | 359/699 |
| 5,077,571 | 12/1991 | Takayama et al. | 354/400 |
| 5,111,226 | 5/1992 | Nakamura et al. | 354/195.1 |
| 5,144,493 | 9/1992 | Nomura | 359/700 |
| 5,216,549 | 6/1993 | Notagashira et al. | 359/699 X |

*Primary Examiner*—Safet Metjahic
*Assistant Examiner*—J. K. Han
*Attorney, Agent, or Firm*—Shapiro and Shapiro

[57] ABSTRACT

A device for varying the focal length of a phototaking optical system comprises a cam member having a cam portion, a guide member having a guide portion, a driven member provided in a part of the phototaking optical system and maintained in contact with the cam portion and the guide portion, and a drive unit for moving the driven member in response to a relative movement of the cam member and the guide member, thereby continuously varying the total length of the phototaking optical system between a telephoto end position and a wide angle end position, wherein the cam member is formed by molding of a resinous material in such a manner that a parting line formed in the cam portion is not contacted by the driven member at the telephoto end position and at the wide angle end position.

14 Claims, 9 Drawing Sheets

FOCAL LENGTH VARYING DEVICE WHICH AVOIDS ERRORS DUE TO MOLD PARTING LINES

This is a continuation of application Ser. No. 08/302,478 filed Sep. 12, 1994, which is a continuation of application Ser. No. 07/918,693 filed Jul. 27, 1992, both now abandoned.

BACKGROUND OF THE INVENTION

1. Field of the Invention

The present invention relates to a focal length varying device for a zoom lens, capable of varying the focal length continuously to the telephoto side or to the wide angle side.

2. Related Background Art

The conventional zoom lens of this kind has at least two lens groups in the lens barrel and is rendered capable of varying the focal length by the change in the distance between said lens groups, thereby enabling the phototaking operation at an arbitrary image magnification. In such zoom lens, the position of the focal plane, or the rear focal length, has to be constant regardless of the zooming position.

In such zoom lens, in response for example to the rotation of a rotatable tube in a predetermined direction, a first lens group in a supporting tube is axially advanced or retracted by a linear helicoid mechanism and a cam tube linked with said rotatable tube is rotated to induce a relative displacement between a circumferential cam groove and an axial cam groove of a guide tube, thereby axially moving a second lens group frontward or backward at the same time with a change in the distance from said first lens group by means of cam pins engaging with said cam grooves, whereby the phototaking operation is rendered possible at an arbitrary image magnification.

However, the above-mentioned cam tube and guide tube, if molded with a plastic material, will inevitably show parting lines, as a result of mold splitting, on the cam faces of the circumferential or axial cam groove. Such parting line constitutes a protrusion on the proper cam face, prone to stop a cam pin, whereby the distance between the first and second lens groups becomes deviated from the designed value and the focal plane no longer remains, therefore, in the constant position.

SUMMARY OF THE INVENTION

An object of the present invention is to provide a focal length varying device capable of maintaining the focal plane at a constant position even when the cam member or the guide member molded with a plastic material presents a parting line or lines on the cam face.

The above-mentioned object can be attained, according to the present invention, by a focal length varying device, including a phototaking optical system capable of varying the focal length continuously to the telephoto side or to the wide angle side, and a drive unit provided in a part of said phototaking optical system and adapted to move a driven member engaging with a cam portion of a cam member and a guide portion of a guide member, through a relative movement of said cam member and said guide member, wherein, in case either of said cam member and guide member is molded with a resinous material, a parting line generated in said molding is positioned at least excluding the telephoto end position and the wide angle end position of said cam and guide portions.

Also the present invention provides a focal length varying device comprising a phototaking optical system capable of varying the focal length continuously to the telephoto side or to the wide angle side, a drive unit provided in a part of said phototaking optical system and adapted to move a driven member engaging with a cam portion of a cam member and a guide portion of a guide member, by a relative movement of said cam and guide members, and a control unit for controlling the function of said drive unit in such a manner that said driven member does not stop on a parting line which is formed in the resin molding said cam or guide member.

According to the present invention, a parting line is not provided in the telephoto end portion or the wide angle end position where the frequency of phototaking is relatively high. Also the driven member (cam pin) is so controlled as not to stop on a parting line of the cam and guide members. Consequently the phototaking operation is not executed when a cam pin rides on a parting line but only when the cam pin is on the proper cam surface, so that the accuracy of the focal plane does not deteriorate.

DETAILED DESCRIPTION OF THE PREFERRED EMBODIMENTS

Figure 1:
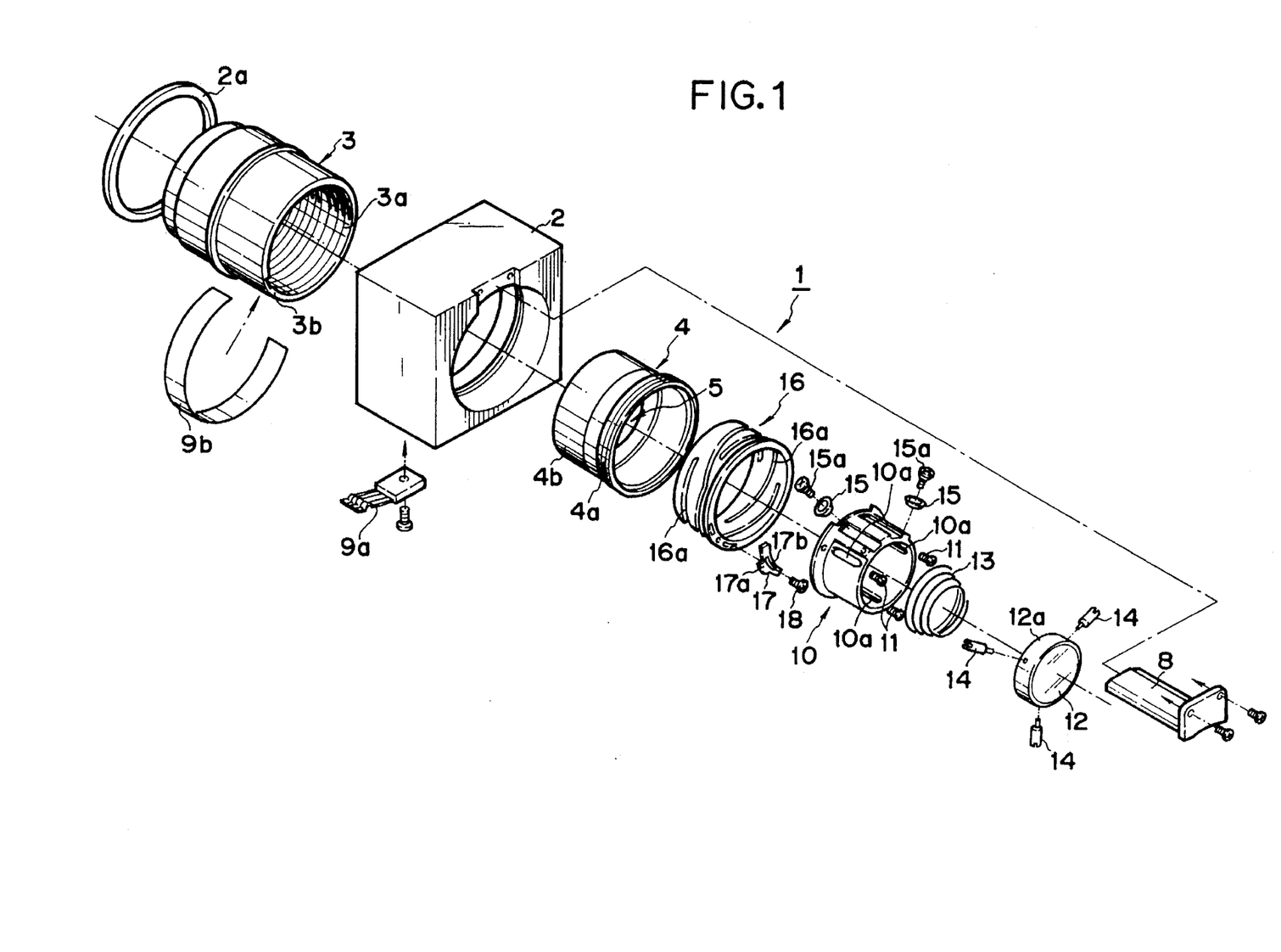
FIG. 1 is an exploded perspective view of mechanical configuration of an embodiment of the focal length varying device of the present invention.
Figure 2:
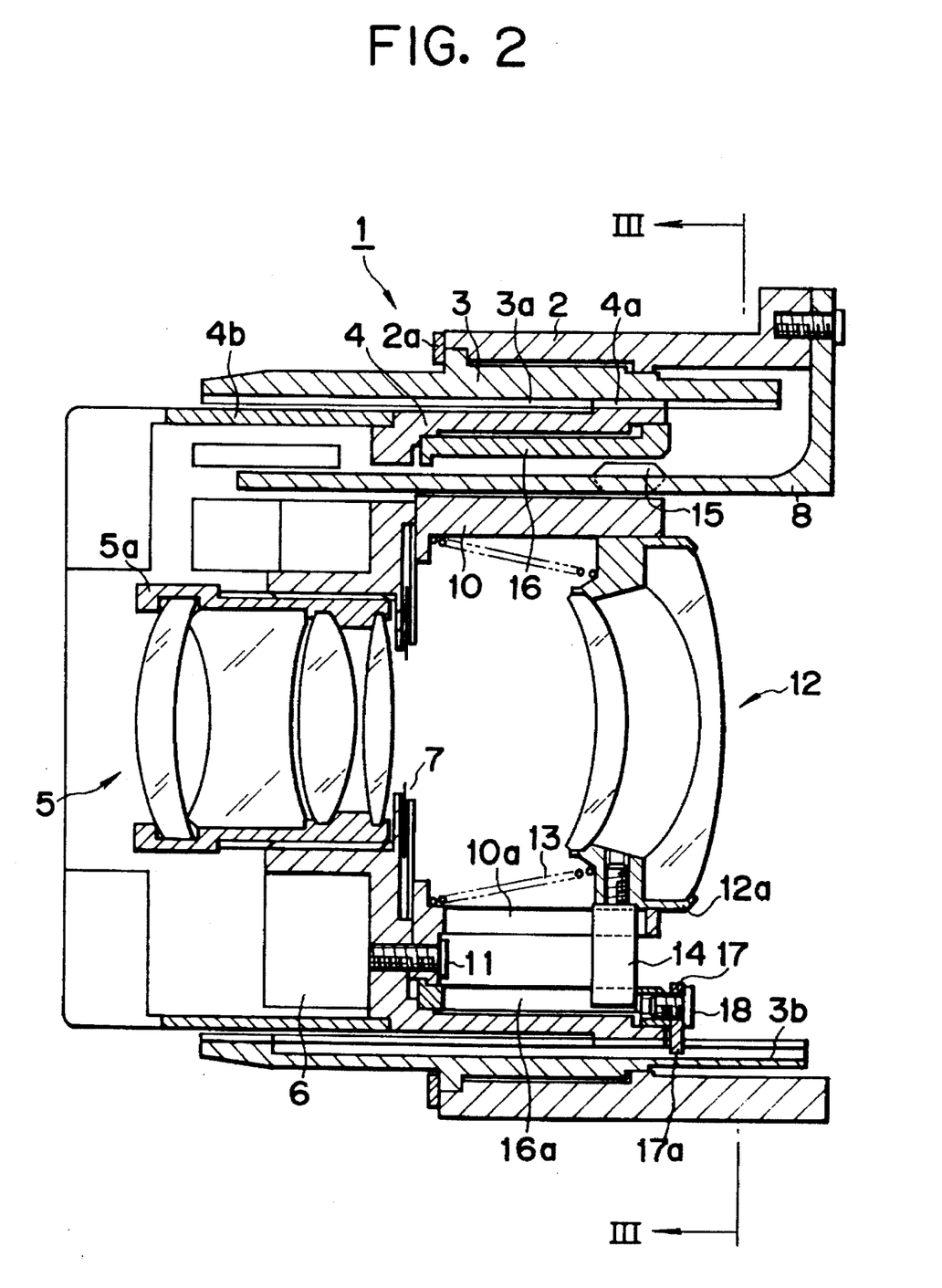
FIG. 2 is a longitudinal cross-sectional view showing mechanical configuration of an embodiment of the focal length varying device of the present invention.
Figure 3:
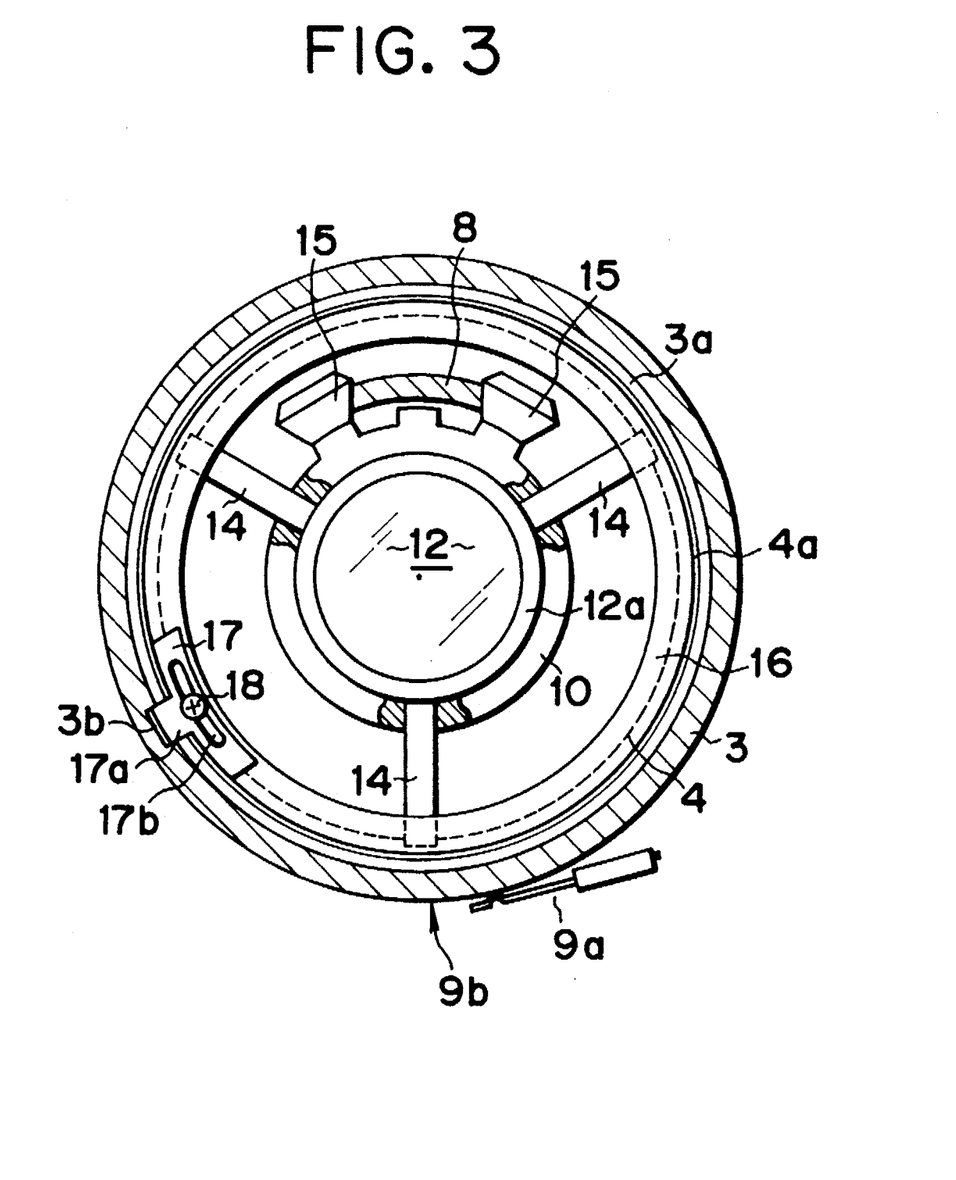
FIG. 3 is a transverse cross-sectional view showing mechanical configuration of an embodiment of the focal length varying device of the present invention.

Now the present invention will be clarified in detail by embodiments thereof shown in the appended drawings. FIGS. 1 to 3 are respectively an exploded perspective view, a longitudinal cross-sectional view and a transversal cross-sectional view, showing mechanical configuration of an embodiment of the focal length varying device of the present invention.

A zoom lens 1 is composed of a rotatable tube 3, a supporting tube 4, a first lens group 5, a guide tube 10, a second lens group 12, cam pins 14, a cam tube 16 etc.

A front side body 2 constitutes a part of the unrepresented main body of a camera, and rotatably supports the rotatable tube 3 in a supporting hole.

Said rotatable tube 3 is prevented from axial movement, relative to the front side body 2, by a tube stopper 2a etc. screwed onto the front side body 2. Said rotatable tube 3 is rotated by a predetermined angle in a desired direction, by an unrepresented zooming drive mechanism. Said rotatable tube 3 is provided, on the internal periphery thereof, with helicoid grooves 3a constituting a linear helicoid mechanism, and supports the supporting tube 4 therein.

The supporting tube 4, serving as a lens barrel, is provided, on the external periphery at the rear end, with helicoid grooves 4a which mesh with the internal helicoid grooves 3a of the rotatable tube 3, whereby the supporting tube 4 is axially moved frontward or backward by the rotation of said rotatable tube 3.

Said supporting tube 4 supports, in a smaller diameter portion at the front end, the first lens group 5 by means of a lens frame 5a. In an annular space outside said smaller diameter portion and covered by a tubular cover 4b, there are provided various mechanical parts including a shutter drive mechanism 6. Also in the supporting tube 4 and at the rear end of the first lens group 5, there is provided a lens shutter mechanism 7.

A substantially L-shaped linear movement key 8 is fixed at the base portion by screws to the rear end side of the front side body 2, and is axially extended at the front end portion in the rotatable tube 3. The front end of said key 8 engages with a part of the supporting tube 4, thereby limiting the rotation thereof.

An encoder board 9b is wound around the rotatable tube 3 as shown in FIG. 1. Said board 9b circumferentially bears unrepresented contact patterns constituting rotary position indicating means, and is in contact with an encoder brush 9a constituting signal collector means and provided on the front side body 2, thereby detecting the rotational position of the rotatable tube 3 and feeding the zooming position of the zoom lens 1 corresponding to said rotational position to a controller 30 (FIG. 10) which controls the aforementioned zooming control mechanism (consisting of a motor 32 and reducing gears).

The guide tube 10 is loosely fitted in a larger diameter portion at the rear end of the supporting tube 4, and is integrally fixed by screws 11 (cf. FIG. 2) at a front end flange. The guide tube 10 is provided with axially extended guide grooves 10a in three positions equally spaced on the external periphery thereof.

The second lens group 12 is axially movably supported in the guide tube 10 and is biased toward the rear end by a spring 13 for play prevention. Said second lens group 12 is provided, at equally spaced three positions on the external periphery of a lens frame 12a thereof, with radially protruding cam pins 14 respectively fitted with the guide grooves 10a or the guide tube 10.

In a part of the external periphery of the guide tube 10, rollers 15, 15 are fixed by screws 15a, 15a and are rotatably embrace the key 8 as shown in FIG. 3, whereby the guide tube 10 can only move in the axial direction together with the supporting tube 4, by the presence of the key 8, and is prevented from rotational movement. As the cam pins 14 are pressed to the rear end of the cam grooves 10a by the spring 13, the second lens group 12 is movably supported, without play, in the guide tube 10.

The cam tube 16 is rotatably supported on the external periphery of the guide tube 10 and on the internal periphery at the rear end of the supporting tube 4 and constitutes a cylindrical cam mechanism in cooperation with said guide tube 10. The guide tube 10 and the cam tube 16 move the second lens group axially relative to the first lens group 5, thereby varying the synthesized focal length of said lens groups 5, 12 and effecting a zooming operation.

On the external periphery of the cam tube 16, there are formed circumferential cam grooves 16a which are oblique to the axial direction and in which inserted are the end portions of the cam pins 14 provided on the second lens group 12 and penetrating through the cam grooves 10a of the guide tube 10.

A clutch plate 17 is fixed, as shown in FIG. 3, on a part of the rear end face of the cam tube 16 by a screw 18, and serves as a connector for linking said cam tube 16 with the rotatable tube 3 in the rotational direction and causing integral synchronized rotation of said tubes. Said clutch plate 17 is provided, as shown in FIGS. 2 and 3, with a radially protruding piece 17a which engages with an axial groove 3b formed in a part of the internal periphery of the rotatable tube 3. Consequently the cam tube 16 is linked with the rotatable tube 3 in an axially movable state in the connected state of the clutch, so that said cam tube 16 can rotate independently from the supporting tube 4 and the guide tube 10 which are advanced or retracted axially by the rotation of the rotatable tube 3, and is still capable of moving in linkage in the axial direction.

The clutch plate 17 is provided, as shown in FIG. 3, with an arc-shaped groove 17b, so that the rotatable tube 3 and the cam tube 16 can mutually rotate when the screw 18 is loosened. Thus the range of relative rotation provided by said arc-shaped groove 17b and said screw 18 provides a margin for adjustment of the rear focal length.

In the above-explained zoom lens, when the rotatable tube 3 is rotated in a required direction by a zooming drive mechanism, such as a motor, provided in the main body of the camera, the linear helicoid mechanism axially advances or retracts the first lens group 5 in the supporting tube 4, and the rotation of the cam tube 16 linked by the clutch plate 17 varies the relative relation of the circumferential cam grooves 16a and the linear cam grooves 10a of the guide tube 10, thereby axially moving also the second lens group 12 by means of the cam pins 14 engaging with said cam grooves, with a change in the distance to the first lens group 5. Thus a zoom phototaking operation can be made at a desired image magnification.

The attained zooming position, determined through the detection of the rotational position of the rotatable tube 3 by the encoder 9 (9a, 9b), is sent to the controller 30. In the above-described cylindrical cam mechanism, when the cam tube 16 is rotated by the rotation of the rotatable tube 3, a rotating force is transmitted to the cam pins 14 engaging with the circumferential cam grooves. However, since said cam pins 14 also engage with the linear cam grooves 10a of the guide tube 10 which cannot rotate but can only move in the axial direction, the rotation does not take place and the rotating force is converted into an axially moving force whereby the second lens group 12 moves frontward or backward according to the movement of the circumferential cam grooves 16a. Thus the distance between the lens groups 5, 12 varies to a desired state, achieving a zooming operation.

As the cam pins 14 of the second lens group 12 are constantly subjected to the biasing force of the spring 13 toward the rear end and are therefore pressed to the lateral edges of the cam grooves, an eventual play existent between the cam groove and the cam pin 14 does not cause any trouble in the operation.

Figure 4:
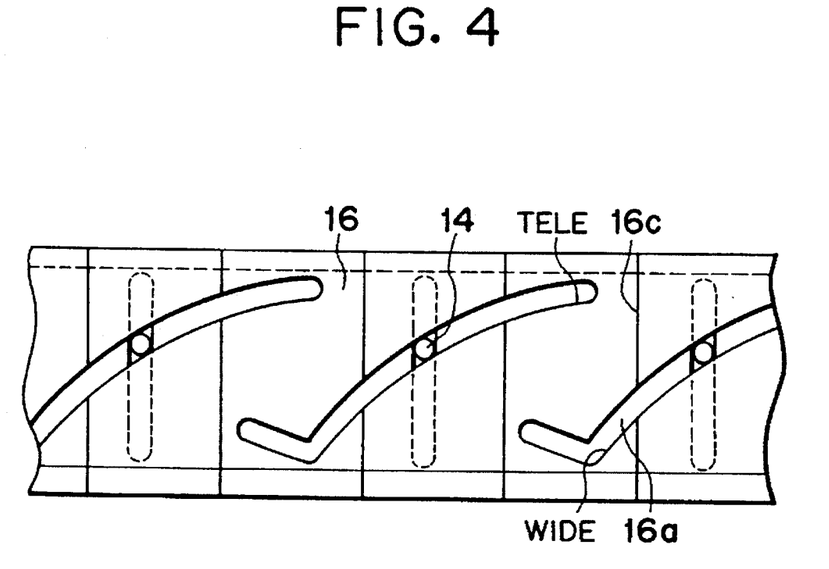
FIG. 4 is a developed view of the external periphery of a cam tube of the focal length varying device of said embodiment.
Figure 5:
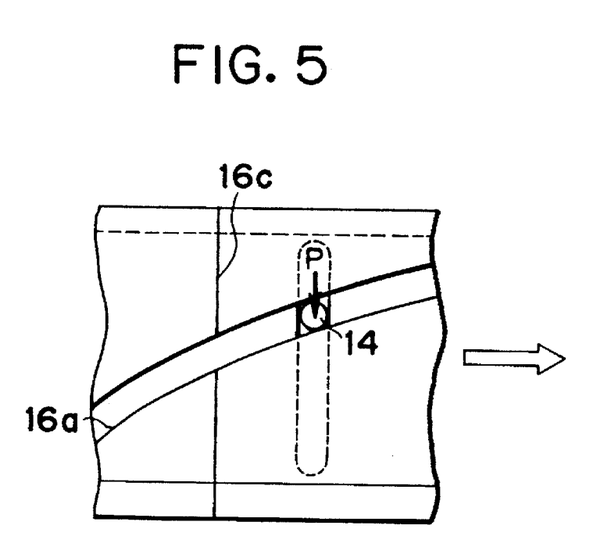
FIG. 5 is a partial magnified view of FIG. 4.
Figure 6:
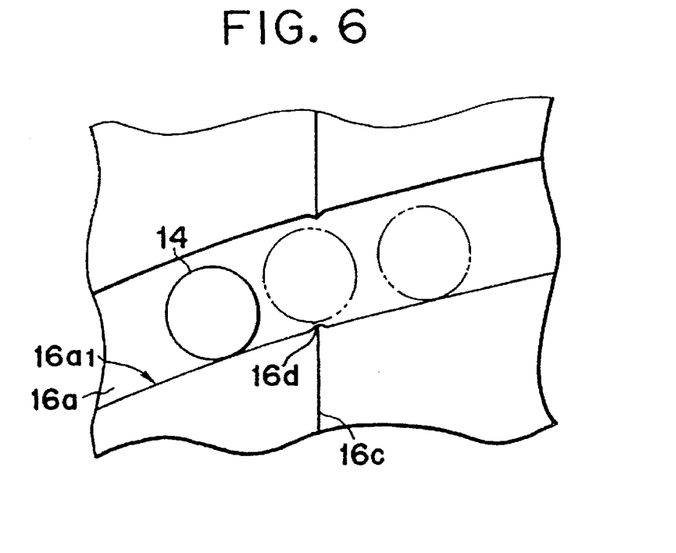
FIG. 6 is a partial magnified view of FIG. 4.

In the following there will be explained the shape of the cam tube 16. FIG. 4 is a developed view of the external periphery of the cam tube of this embodiment; FIGS. 5 and 6 are partial magnified views of FIG. 4; and FIGS. 7 and 8 are plan views showing the states of mold splitting.

Figure 7:
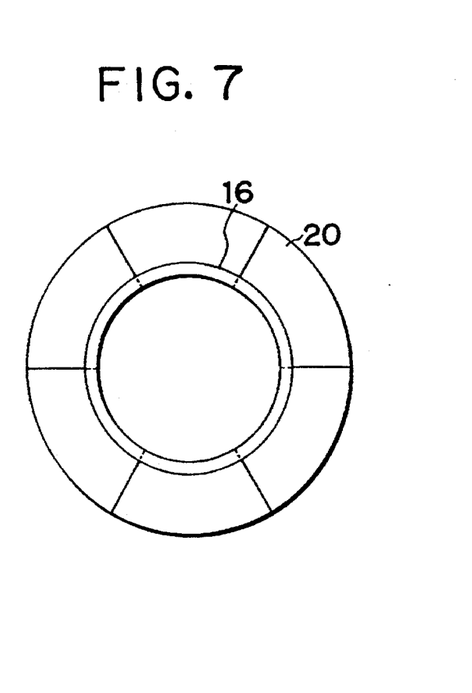
FIGS. 7 and 8 are plan views showing mold splitting for the cam tube for the embodiment.
Figure 8:
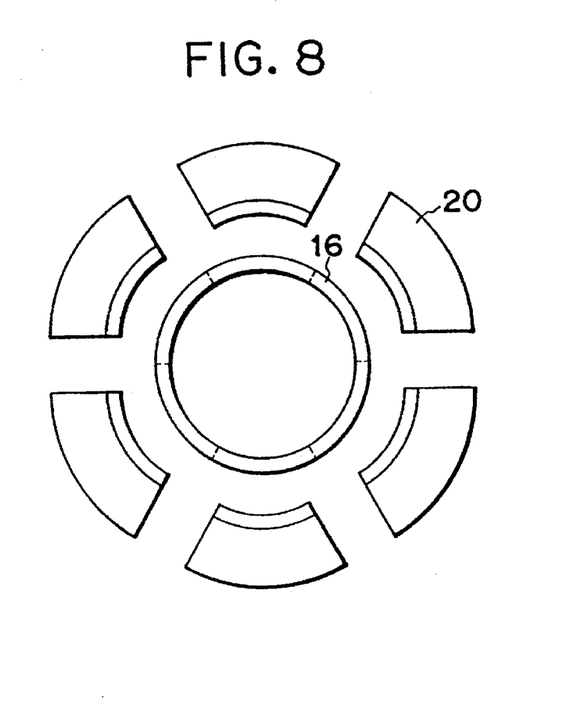

Since the cam tube 16 is cylindrical, the mold 20 is radially split from the center of the tube 16, as shown in FIGS. 7 and 8. In this embodiment, since the mold 20 is equally split into six portions, the cam tube 16 will show equally spaced six parting lines 16c as shown in FIG. 4. In FIG. 5, an arrow P indicates the direction of the biasing force of the spring 13 shown in FIG. 1, so that the cam pin 14 is always pressed to a reference face 16a1 of the circumferential cam groove 16a.

As shown in FIG. 6, the parting line 16c is also present, as a protrusion 16d, on the reference face 16a1 of the circumferential cam groove 16a. Therefore, upon passing through said protrusion 16d, the cam pin 14 is deviated from the reference face 16a1 of the cam groove 16a, so that the distance between the first lens group 5 and the second lens group 12 does not match the designed value.

Since the parting lines 16c and the circumferential cam grooves 16a are equally distributed on the external periphery, the position of the protrusion 16d formed in the circumferential cam groove 16a is the same in all the circumferential cam grooves 16a, so that the equally distributed cam pins 14a almost simultaneously impinge on the protrusions 16d.

In the present embodiment, as shown in FIG. 4, the parting line 16c is excluded from the wide angle end WIDE and the telephoto end TELE because the phototaking operation in the conducted is often conducted at the wide angle end WIDE and at the telephoto end TELE.

Figure 9:
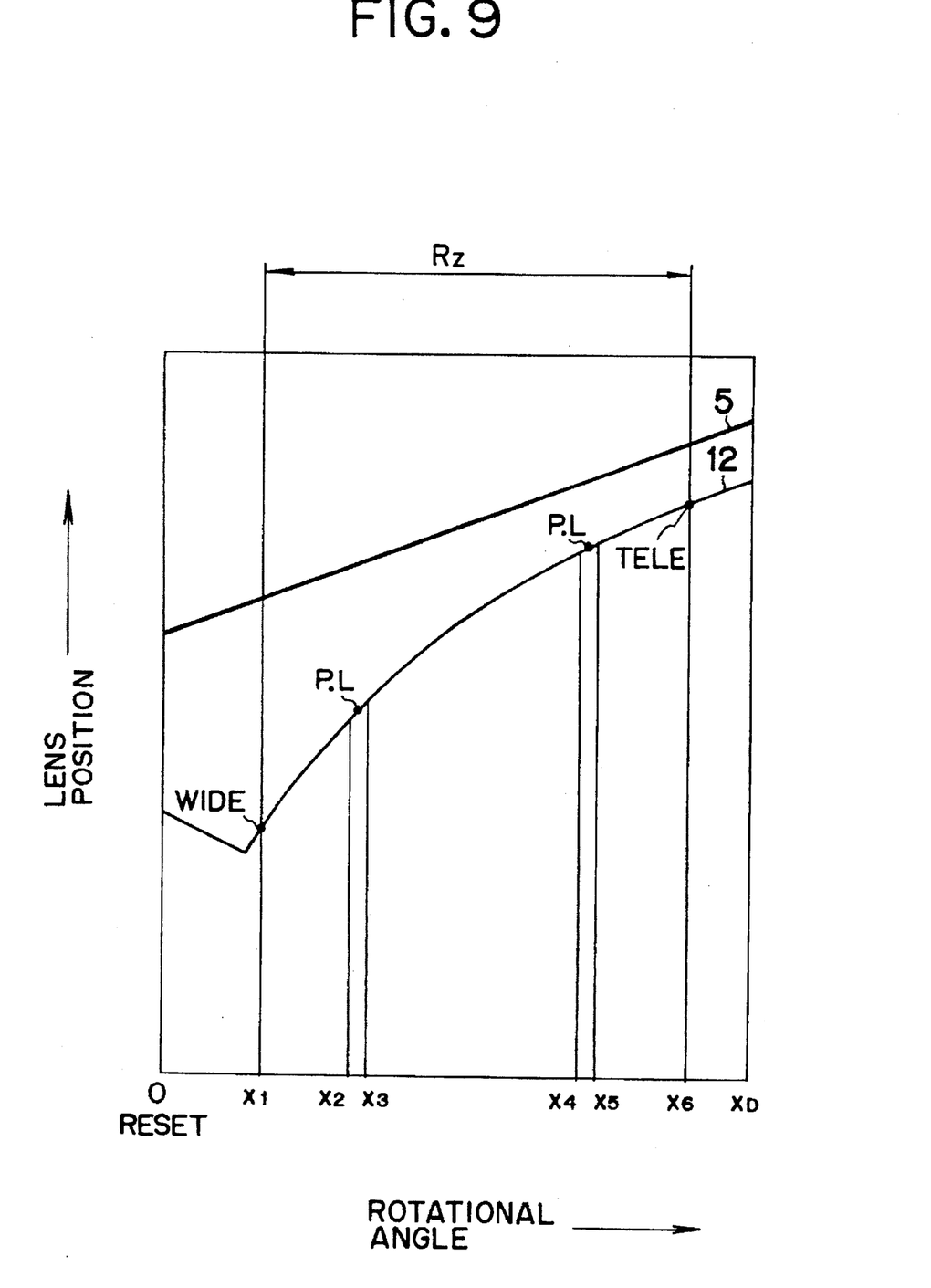
FIG. 9 is a chart showing the relationship between the movements of the first and second lens groups and the rotation angle of the rotatable tube in said embodiment.

FIG. 9 is a chart showing the relationship between the positions of the first and second lens groups 5, 12 and the rotation angle of the rotatable tube of the focal length varying device of the above-explained embodiment. The rotation angle x of the rotatable tube 3 has a reset position 0, a wide angle end position $x_1$, a telephoto end position $x_6$ and an end position $x_D$, which are used as reference for the positions of the cam pins 14. The distance between the first and second lens groups 5, 12 is maintained at values shown in FIG. 9, according to the rotation angle x. The ordinary zooming range is indicated by $R_z$.

Influence by the interference between the protrusion 16d formed by the parting line 16c of the cam tube 16 and the cam pin 14 may appear in the rotation angle ranges $x_2$–$x_3$ and $x_4$–$x_5$. In the present embodiment, therefore, control is so conducted that the cam pin 14 does not stop in these ranges.

Figure 10:
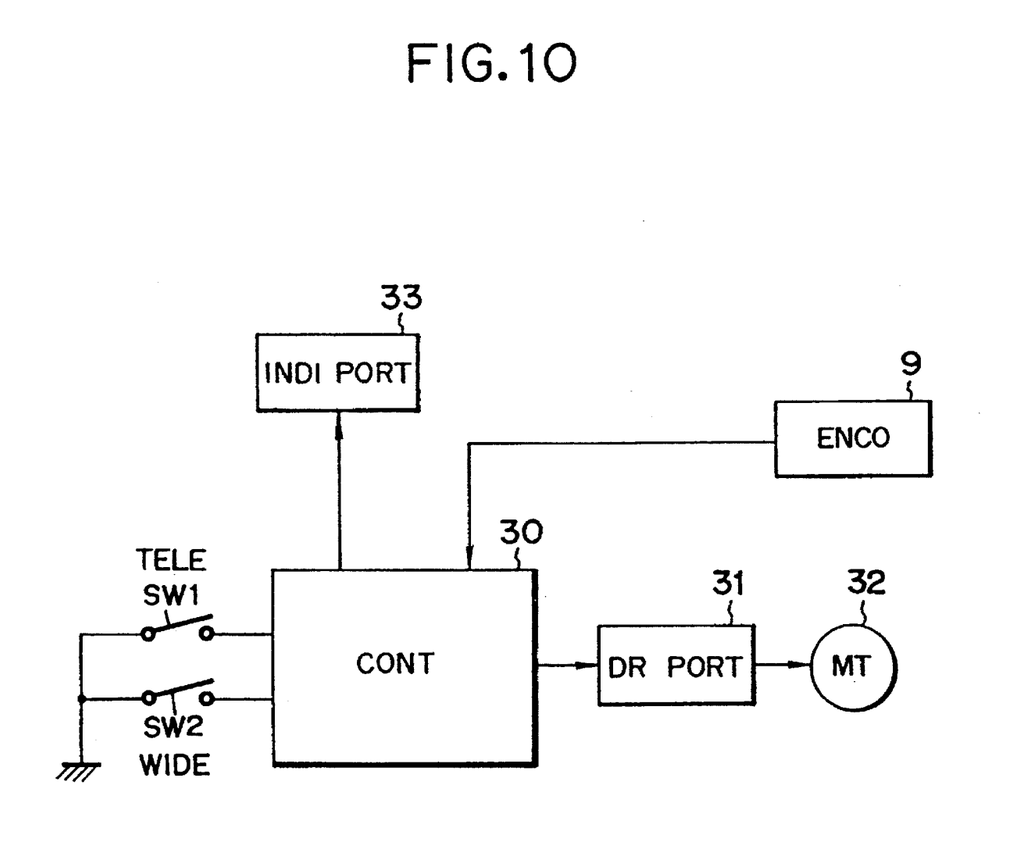
FIG. 10 is a block diagram of an embodiment of the focal length varying device of the present invention.
Figure 11:
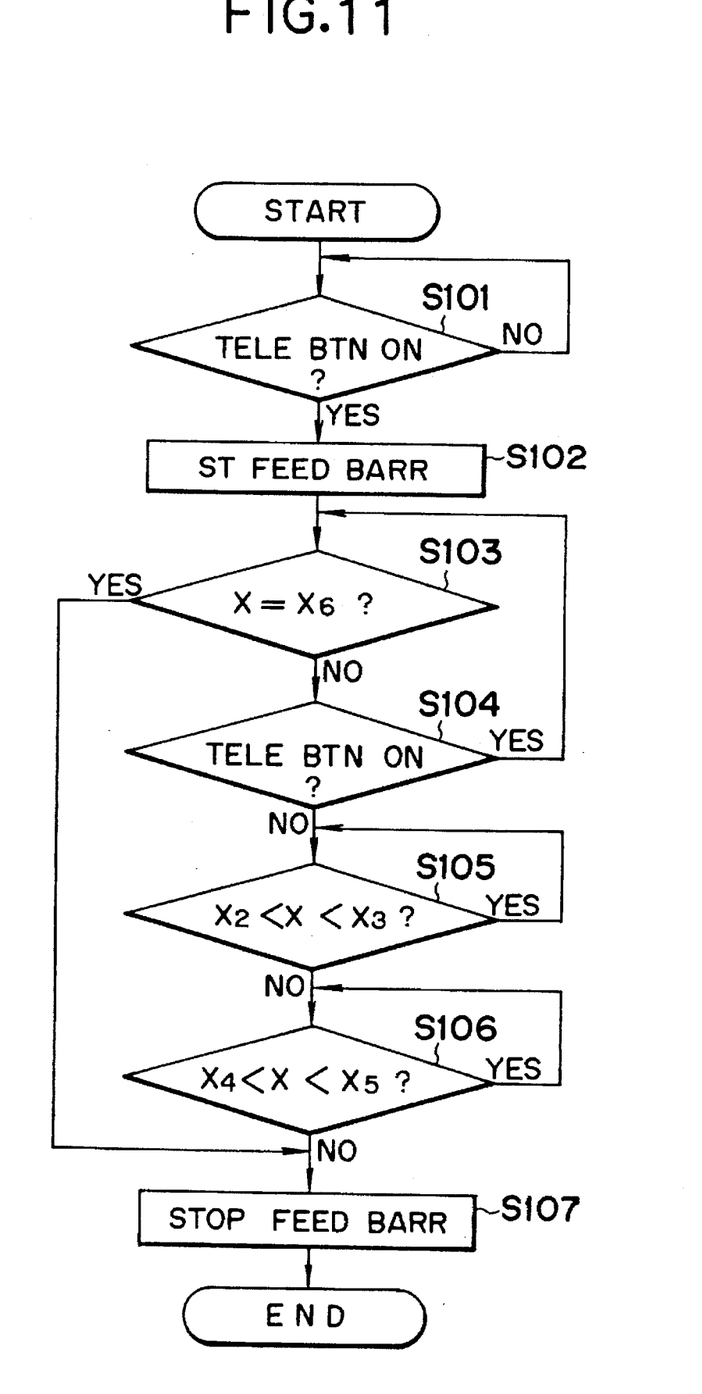
FIGS. 11 and 12 are flow charts showing the function of a controller in said embodiment.
Figure 12:
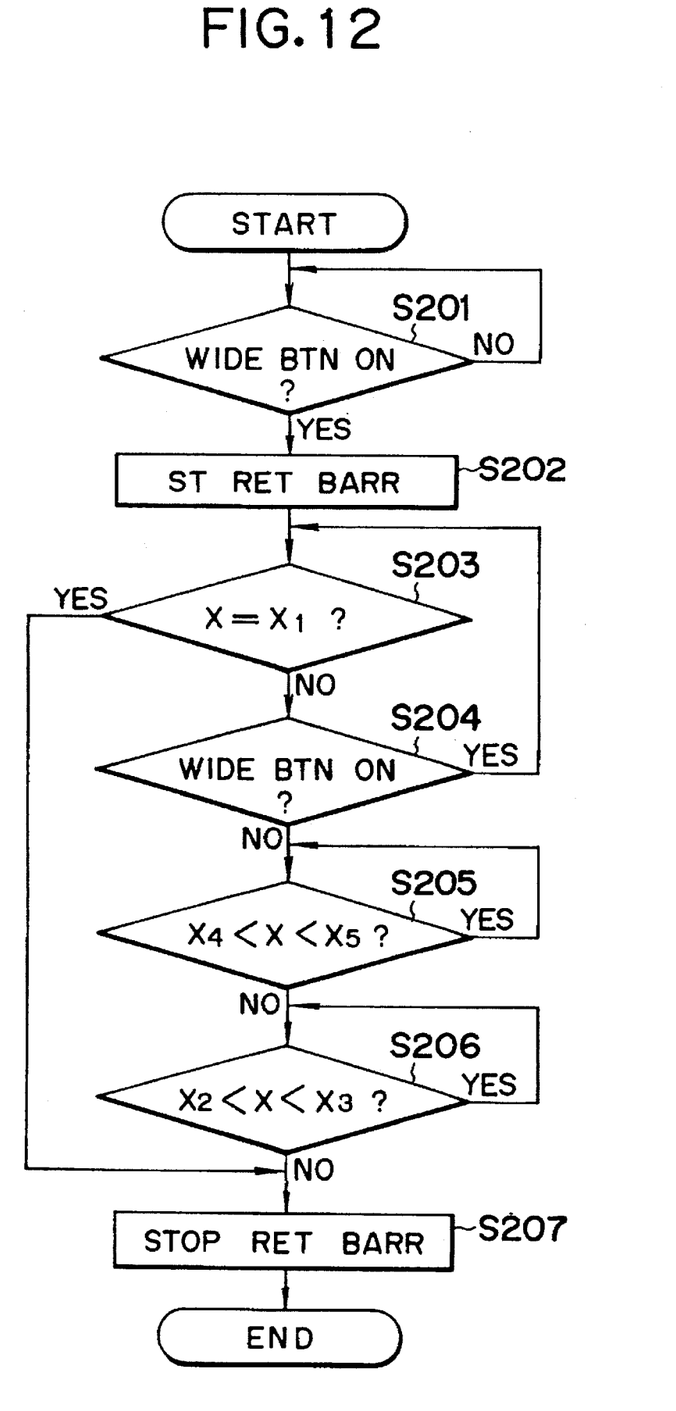

FIG. 10 is a block diagram showing an embodiment of the focal length varying device of the present invention, and FIGS. 11 and 12 are flow charts showing the control sequence of the controller. The controller 30 receives the outputs of a telephoto button (switch) Sw1 and a wide angle button (switch) SW2. In response to a signal received from the switch SW1 or SW2, the controller 30 generates a zoom drive signal to the telephoto side or the wide angle side, thereby driving a zoom motor 32 through a drive unit 31.

Referring to FIG. 11, at first there is discriminated whether the telephoto button SW1 has been actuated (S101), and, if actuated, the motor 32 is activated to start the advancement of the lens barrel (S102). If the telephoto button SW1 has not been actuated, the controller enters a stand-by state.

The rotation angle x of the rotatable tube 3 is constantly monitored by the encoder (detector) 9, and, when the lens barrel is advanced, the controller 30 discriminates whether a state $x=x_6$ (telephoto end position) has been reached (S103). If this state is reached, the advancement of the lens barrel is terminated (S107).

On the other hand, if $x \neq x_6$ (S103), there is discriminated whether the telephoto button SW1 is on (S104), and, if so, the advancement of the lens barrel is continued. If the telephoto button SW1 is turned off, the position of the rotation angle x is confirmed (S105), and, if it is in a range $x_2 < x < x_3$, the advancement of the lens barrel is continued until the rotation angle x reaches a position $x_3$.

If x is not in the last-mentioned range, the position of the rotation angle x is confirmed again (S106), and, if it is within a range $x_4 < x < x_5$, the advancement of the lens barrel is continued until the rotation angle x reaches a position $x_5$. If the rotation angle x is within any of ranges $x_1 < x < x_2$, $x_3 < x < x_4$ and $x_5 < x < x_6$ (S105, S106), the advancement of the lens barrel is terminated (S107).

When the wide angle button SW2 is depressed, the flow chart shown in FIG. 12 is executed, and, if the rotation angle x is within any of the ranges $x_2$–$x_3$ and $x_4$–$x_5$ (S206, S205), after the wide angle button SW2 is turned off, the lens barrel is stopped after retraction to a position corresponding to the rotation angle $x_2$ or $x_4$ (S207).

In the foregoing description, there have been explained parting lines formed on the cam tube 16, but similar parting lines are naturally present also in the linear guide grooves 10a of the guide tube 10, because it is also formed by molding. Consequently the guide tube 10 has also to be formed in such a manner, as in the cam tube 16, that the parting lines are not formed on the wide angle end position WIDE and the telephoto end position TELE.

The present invention is not limited to the embodiment explained above but is subject to various modifications. For example, in case the rotatable tube is manually rotated, a display unit 33 (FIG. 10) may be provided for example in a view finder and may be activated when a cam pin is detected to be present on a parting line, by the rotation angle signal from the encoder. Also there may be employed direct detection of a protrusion, instead of the rotation angle signal from the encoder.

As detailedly explained in the foregoing, according to the present invention, when the cam member or the guide member is molded with a plastic material, a parting line is excluded from the telephoto end position or the wide angle end position where the frequency of phototaking operation is relatively high. Consequently, even when the focal length is varied without particular control, a cam pin does not ride on a parting line at the telephoto end position or at the wide angle end position, and the accuracy of focal plane does not deteriorate.

Also according to the present invention, control is so executed that a cam pin does not stop on a parting lines present in the cam member and/or the guide member, so that the phototaking operation is not carried out in a state in which the cam pin rides on such parting line and the accuracy of the focal plane does not deteriorate.

What is claimed is:

1. A device for varying the focal length of a phototaking optical system, comprising:

a molded plastic cam member having a cam portion with a parting line;

a guide member having a guide portion;

a driven member provided in a part of said phototaking optical system and maintained in contact with said cam portion and said guide portion, said driven member being moved in response to relative movement of said cam member and said guide member;

a drive unit which causes said relative movement of said cam member and said guide member, thereby moving said driven member and continuously varying the focal length of said phototaking optical system between a telephoto end and a wide angle end; and a control unit which energizes and de-energizes said drive unit and which controls said drive unit so as to prevent said driven member from stopping in contact with said parting line.

2. A device according to claim 1, wherein said control unit has a detector that detects when said driven member is close to said parting line.

3. A device according to claim 1, wherein said control unit has a switch unit changeable between a first state in which said control unit energizes said drive unit and a second state in which said control unit de-energizes said drive unit, and, when changing of said switch unit from said first state to said second state would cause said driven member to stop in contact with said parting line, said drive unit is maintained energized until said driven member is moved away from contact with said parting line.

4. A device for varying the focal length of a phototaking optical system, comprising:

a cam member having a cam portion;

a molded plastic guide member having a guide portion with a parting line;

a driven member provided in a part of said phototaking optical system and maintained in contact with said cam portion and said guide portion;

a drive unit which moves said driven member and said guide member, thereby continuously varying the focal length of said phototaking optical system between a telephoto end and a wide angle end; and a control unit which energizes and de-energizes said drive unit and which controls said drive unit so as to prevent said driven member from stopping in contact with said parting line.

5. A device according to claim 4, wherein said control unit has a detector that detects when said driven member is close to said parting line.

6. A device according to claim 4, wherein said control unit has a switch unit changeable between a first state in which said control unit energizes said drive unit and a second state in which said control unit de-energizes said drive unit, and, when changing of said switch unit from said first state to said second state would cause said driven member to stop in contact with said parting line, said drive unit is maintained energized until said driven member is moved away from contact with said parting line.

7. A device for varying the focal length of a phototaking optical system, comprising:

a molded plastic cam member having a cam portion with a parting line;

a guide member having a guide portion;

a driven member provided in a part of said phototaking optical system and maintained in contact with said cam portion and said guide portion, said driven member being moved in response to relative movement of said cam member and said guide member;

a drive unit which causes said relative movement of said cam member and said guide member, thereby moving said driven member and continuously varying the focal length of said phototaking optical system between a telephoto end position and a wide angle end position; and a control unit which energizes and de-energizes said drive unit and which controls said drive unit so as to prevent said driven member from stopping in contact with said parting line.

8. A device according to claim 7, wherein said control unit has a detector that detects when said driven member is close to said parting line.

9. A device according to claim 7, wherein said control unit has a switch unit changeable between a first state in which said control unit energizes said drive unit and a second state in which said control unit de-energizes said drive unit, and, when changing of said switch unit from said first state to said second state would cause said driven member to stop in contact with said parting line, said drive unit is maintained energized until said driven member is moved away from contact with said parting line.

10. A device for varying the focal length of a phototaking optical system, comprising:

a cam member having a cam portion;

a molded plastic guide member having a guide portion with a parting line;

a driven member provided in a part of said phototaking optical system and maintained in contact with said cam portion and said guide portion, said driven member being moved in response to relative movement of said cam member and said guide member;

a drive unit which causes said relative movement of said cam member and said guide member, thereby continuously varying the focal length of said phototaking optical system between a telephoto end position and a wide angle end position;

and a control unit which energizes and de-energizes said drive unit and which controls said drive unit so as to prevent said driven member from stopping in contact with said parting line.

11. A device according to claim 10, wherein said control unit has a detector that detects when said driven member is close to said parting line.

12. A device according to claim 7, wherein said control unit has a switch unit changeable between a first state in which said control unit energizes said drive unit and a second state in which said control unit de-energizes said drive unit, and, when changing of said switch unit from said first state to said second state would cause said driven member to stop in contact with said parting line, said drive unit is maintained energized until said driven member is moved away from contact with said parting line.

13. A device for varying a focal length of a phototaking optical system, comprising:

a molded plastic cam member having a cam portion;

a guide member having a guide portion;

a driven member provided in a part of said phototaking optical system and maintained in contact with said cam portion and said guide portion;

a drive unit which moves said driven member in response to a relative movement of said cam member and said guide member, thereby continuously varying the focal length of said phototaking optical system between a telephoto end and a wide angle end;

a detector which detects a relative movement of said cam member and said driven member; and a control unit which controls said drive unit in setting a predetermined focal length based on a result of detection by said detector, so that said driven member is not stopped within a predetermined position range surrounding a position where said driven member is brought into contact with a parting line formed on said cam portion in molding.

14. A device for varying the focal length of a phototaking optical system, comprising:

a molded plastic guide member having a guide portion;

a cam member having a cam portion;

a driven member provided in a part of said phototaking optical system and maintained in contact with said cam portion and said guide portion;

a drive unit which moves said driven member in response to a relative movement of said cam member and said guide member, thereby continuously varying the focal length of said phototaking optical system between a telephoto end and a wide angle end;

a detector which detects a relative movement of said guide member and said driven member and a control unit which controls said drive unit in setting a predetermined focal length based on a result of detection by said detector, so that said driven member is not stopped within a predetermined position range surrounding a position where said driven member is brought into contact with a parting line formed on said guide portion in molding.

* * * * *